(12) United States Patent
Wang et al.

(10) Patent No.: US 8,249,509 B2
(45) Date of Patent: Aug. 21, 2012

(54) DYNAMIC CHANNEL ESTIMATION BASED ON CHANNEL CONDITIONS

(75) Inventors: Genyuan Wang, Plano, TX (US); Hang Jin, Plano, TX (US); Allaukik Abhishek, Irving, TX (US); Daniel Wee, Garland, TX (US)

(73) Assignee: Cisco Technology, Inc., San Jose, CA (US)

( * ) Notice: Subject to any disclaimer, the term of this patent is extended or adjusted under 35 U.S.C. 154(b) by 753 days.

(21) Appl. No.: 12/276,518

(22) Filed: Nov. 24, 2008

(65) Prior Publication Data

US 2010/0130135 A1   May 27, 2010

(51) Int. Cl.
    *H04B 17/00* (2006.01)
(52) U.S. Cl. ..................... 455/62; 455/67.11
(58) Field of Classification Search ............ 455/62, 455/67.11–67.16
    See application file for complete search history.

(56) References Cited

U.S. PATENT DOCUMENTS

| | | | |
|---|---|---|---|
| 6,961,364 B1 | 11/2005 | Laroia et al. | |
| 7,388,979 B2 | 6/2008 | Sakai et al. | |
| 7,389,086 B2 * | 6/2008 | Toda et al. | ........ 455/67.11 |
| 7,733,989 B2 | 6/2010 | Guey | |
| 7,778,211 B2 | 8/2010 | Hedayat et al. | |
| 7,792,352 B2 | 9/2010 | Sakai et al. | |
| 2003/0043732 A1 | 3/2003 | Walton et al. | |
| 2003/0123559 A1 | 7/2003 | Classon et al. | |
| 2005/0147287 A1 | 7/2005 | Sakai et al. | |
| 2006/0203932 A1 | 9/2006 | Palanki et al. | |
| 2006/0280262 A1 | 12/2006 | Malladi | |
| 2007/0041311 A1 | 2/2007 | Baum et al. | |
| 2008/0049814 A1 * | 2/2008 | Jeon | ............ 375/147 |
| 2008/0076477 A1 | 3/2008 | Hedayat et al. | |
| 2008/0101489 A1 | 5/2008 | Wang et al. | |

(Continued)

FOREIGN PATENT DOCUMENTS

EP    1936901 A2    6/2008

OTHER PUBLICATIONS

International Search Report and Written Opinion dated Sep. 12, 2009; cited in PCT/US2009/031061.

(Continued)

*Primary Examiner* — Khanh V Nguyen
(74) *Attorney, Agent, or Firm* — Edell, Shapiro & Finnan, LLC (57) ABSTRACT

A dynamically adaptive channel estimation process is provided for use in a wireless communication device. At a first device, a wireless transmission is received from a second device. The transmission comprises a plurality of successive symbols each of which comprises a plurality of subcarriers. The first device is configured to compute channel characterizing information for a wireless channel between the first device and the second device based on the received values at subcarriers of the successive symbols. The first device is configured to select one of a plurality of channel estimation schemes based on the channel characterizing information, and to compute an estimate of channel information for the wireless channel using the selected one of the plurality of channel estimation schemes.

21 Claims, 9 Drawing Sheets

U.S. PATENT DOCUMENTS

| | | |
|---|---|---|
| 2008/0123516 A1 | 5/2008 | Anderson et al. |
| 2008/0159455 A1 | 7/2008 | Wang et al. |
| 2008/0165901 A1 | 7/2008 | Krupka |
| 2008/0232674 A1 | 9/2008 | Sakai et al. |
| 2009/0042530 A1 | 2/2009 | Wang et al. |
| 2009/0116592 A1 | 5/2009 | Namba et al. |
| 2010/0130135 A1 | 5/2010 | Wang et al. |
| 2010/0157861 A1 | 6/2010 | Na et al. |
| 2010/0165851 A1 | 7/2010 | Mantravadi et al. |
| 2010/0328446 A1 | 12/2010 | Sakai et al. |

OTHER PUBLICATIONS

Office Action mailed Jun. 16, 2011 in U.S. Appl. No. 12/182,238.

Mehmet Kemal Ozdemir et al., "Channel Estimation for Wireless OFDM Systems," IEEE Communications Surveys, vol. 9, No. 2, Apr. 1, 2007, pp. 18-48.

Xiaodai Dong et al, "Linear Interpolation in Pilot Symbol Assisted Channel Estimation for OFDM," IEEE Transactions on Wireless Communications, vol. 6, No. 5, May 1, 2007, pp. 1910-1920.

* cited by examiner

DYNAMIC CHANNEL ESTIMATION BASED ON CHANNEL CONDITIONS

TECHNICAL FIELD

The present disclosure relates to estimating conditions of a wireless channel in a wireless communication system.

BACKGROUND

Radio frequency wireless communication between two wireless communication devices involves certain challenges associated with the conditions of the over-the-air wireless channel between the two devices. For applications where the information to be transmitted requires a relatively high transmission rate and the devices may be moving with respect to each other, it is important that each device on the link be able to compute accurate information representing the current conditions of the channel.

One technique that has been in use in wireless communication systems is to include pilot signals in the transmissions between devices. Generally, the channel information can be estimated based on the pilot signals if there are sufficient number of pilot signals in a transmission. However, in certain practical applications, there is limited availability for pilot signals. Moreover, for certain applications, the transmissions are relatively short in time duration, making it challenging to accurately estimate the channel conditions.

There is room for improving channel estimation in wireless communication devices, and in particular, to make channel estimation more dynamically adaptable to changing conditions of the wireless channel.

DESCRIPTION OF EXAMPLE EMBODIMENTS

Overview

A dynamically adaptive channel estimation process is provided for use in a wireless communication device. At a first device, a wireless transmission is received from a second device. The transmission comprises a plurality of successive symbols each of which comprises a plurality of subcarriers. The first device is configured to compute channel characterizing information for a wireless channel between the first device and the second device based on the received values at subcarriers of the successive symbols. The first device is configured to select one of a plurality of channel estimation schemes based on the channel characterizing information, and to compute an estimate of channel information for the wireless channel using the selected one of the plurality of channel estimation schemes.

Figure 1:
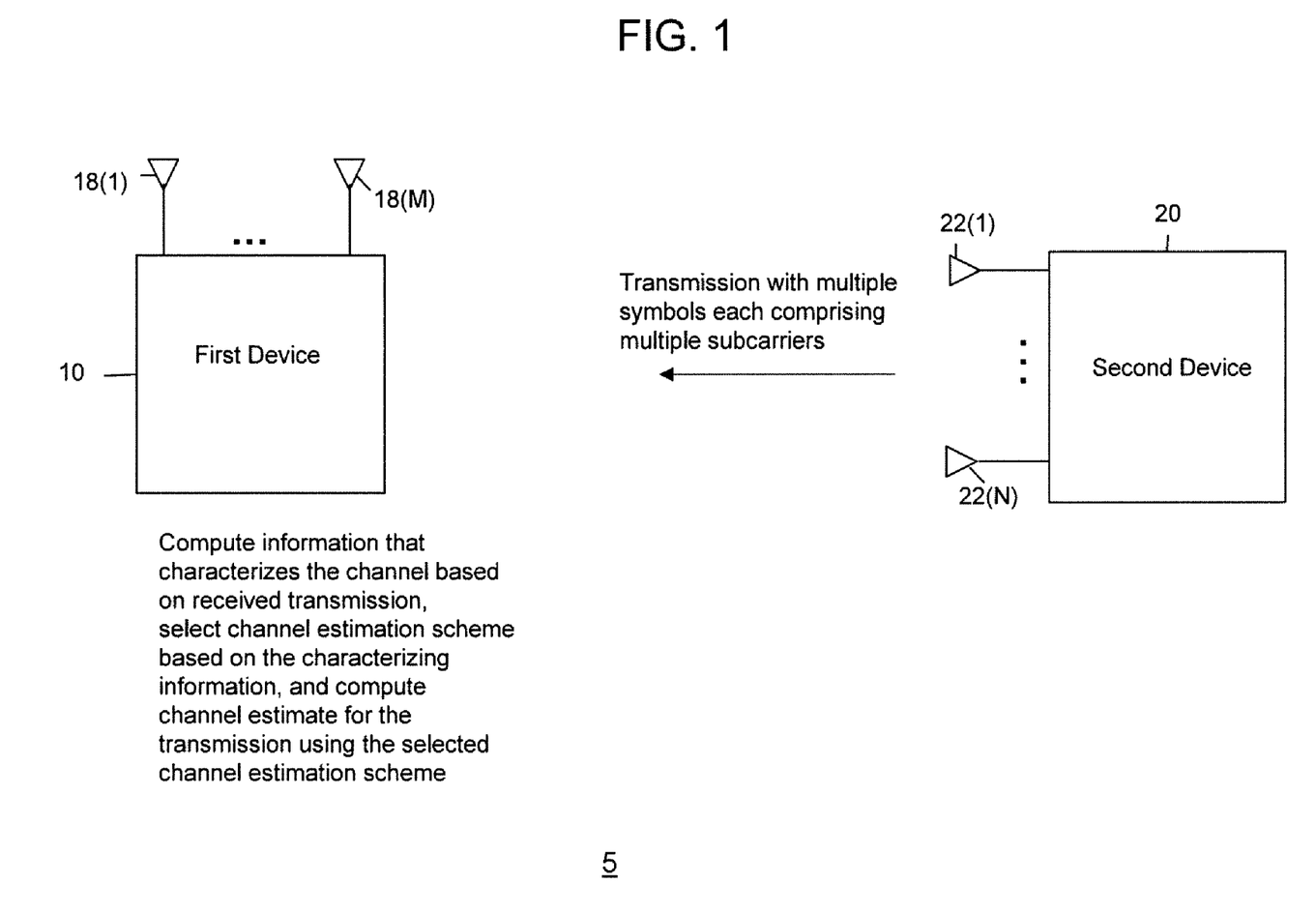
FIG. 1 is a block diagram of a wireless communication system in which at least one device on a wireless communication link is configured to perform an adaptive channel estimation process.

Referring first to FIG. 1, a wireless communication system 5 is shown comprising a first wireless communication device 10 and a second wireless communication device 20. The first device 10 comprises one or more antennas 18(1)-18(M) and the second device comprises one or more antennas 22(1)-22(N). Only two devices are shown in FIG. 1 for purposes of describing the techniques herein, but it should be understood that the system 50 may comprise three or more communication devices, any two of which can wireless communicate with each other. In addition, in certain applications, multiple wireless communication devices communicate with a designated wireless communication device that serves as a gateway or access point to other (wired or wireless) networks.

The devices 10 and 20 may be configured to perform a broadband wireless communication signaling protocol, such as that used in WiMAX™ systems or 3G Long Term Evolution (LTE) systems. More generally, the second device 20 sends a wireless transmission via its antennas 22(1)-22(M) to the first device 10. The transmission comprises multiple symbols, and each symbol comprises multiple subcarriers. In an example described herein, the transmission is formatted according to orthogonal frequency division multiple access (OFDMA) techniques, such as, but not limited to, those OFDMA techniques used in a WiMAX system.

The first device 10 receives the transmission from the second device and is configured to compute information that characterizes the wireless channel between the first device 10 and the second device 20. The first device 10 is further configured to select one of a plurality of channel estimation schemes based on the characterizing information for the channel, and to compute a channel estimate for the transmission using the selected channel estimation scheme. While the foregoing channel estimation techniques described herein are particularly useful for a channel between two devices that have multiple antennas, this is only an example. Thus, the first device 10 may have a single antenna and the second device 20 may have a single antenna.

FIG. 1 shows that the transmission is sent by the second communication device 20 to the first communication device 10, and that the first communication device computes the channel estimate. However, this is only an example. The second communication device 20 may also compute a channel estimate based on similar transmissions sent from the first communication device 10. For simplicity in describing the techniques herein, the first device 10 is configured to compute the channel estimate based on a transmission received from the second device 20.

Figure 2:
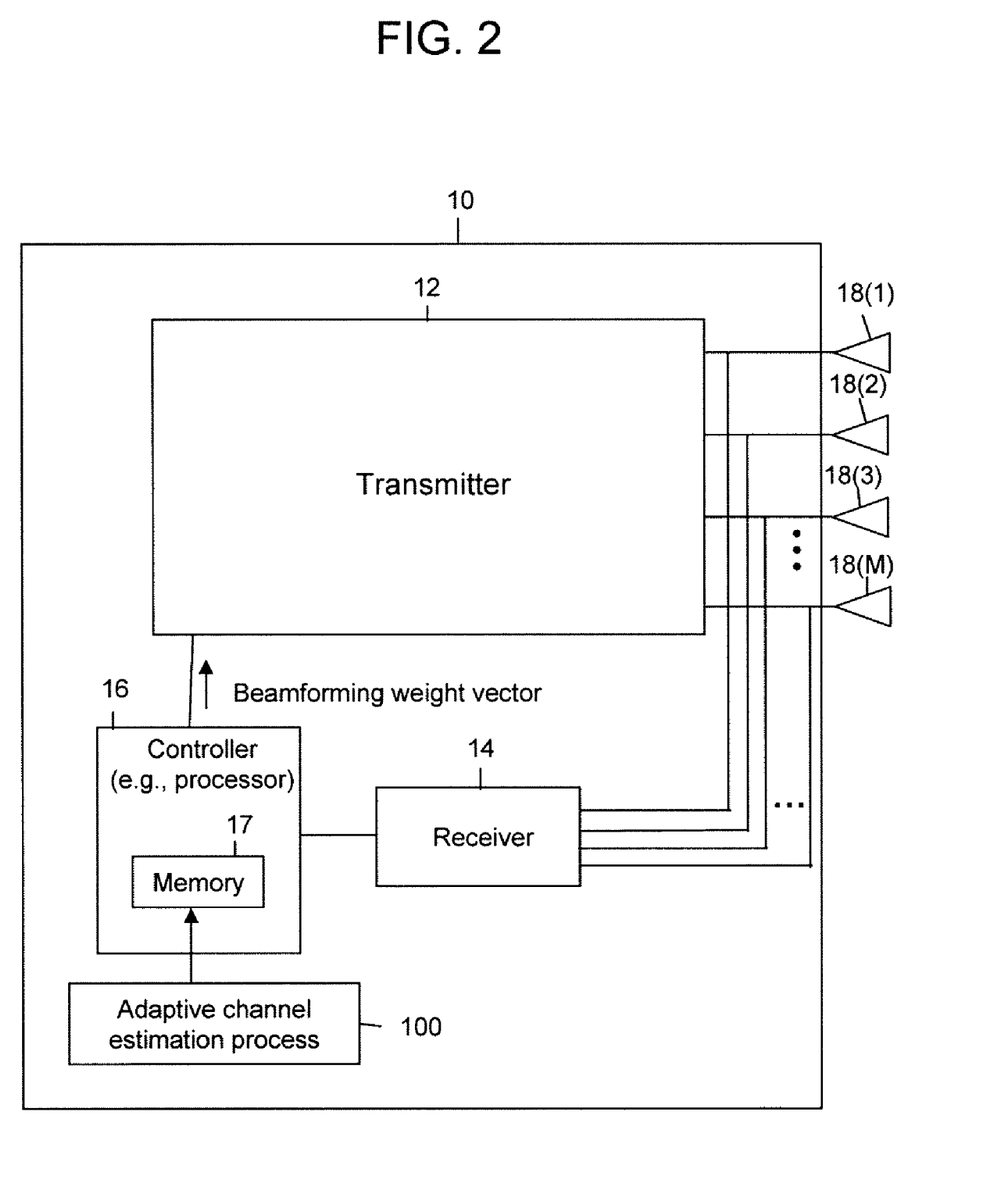
FIG. 2 is a block diagram of a wireless communication device configured to perform an adaptive channel estimation process.

To this end, reference is now made to FIG. 2 that shows an example of a block diagram of the first device 10 that is configured to perform the channel estimate process as generally depicted in FIG. 1. The second device 20 may have a very similar configuration.

As shown in FIG. 2, the first device 10 comprises a transmitter 12, a radio receiver 14 and a controller 16. The controller 16 supplies data to the transmitter 12 to be transmitted and processes signals received by the receiver 14. In addition, the controller 16 performs other transmit and receive control functionality. Part of the functions of the transmitter 12, receiver 14 and controller 16 may be implemented in a modem and other parts of the transmitter 12 and receiver 14 may be implemented in radio transmitter and radio transceiver circuits. It should be understood that there are analog-to-digital converters (ADCs) and digital-to-analog converters (DACs) in the various signal paths to convert between analog and digital signals.

The transmitter 12 may comprise individual transmitter circuits that supply respective upconverted signals to corresponding ones of a plurality of antennas 18(1)-18(M) for transmission. For simplicity, these individual transmitter circuits are not shown. The receiver 14 receives the signals detected by each of the antennas 18(1)-18(M) and supplies corresponding antenna-specific receive signals to controller 16. It is understood that the receiver 14 may comprise a plurality of individual receiver circuits, each for a corresponding one of a plurality of antennas and which outputs a receive signal associated with a signal detected by a respective one of the plurality of antennas 18(1)-18(M). For simplicity, these individual receiver circuits are not shown.

The controller 16 comprises a memory 17 or other data storage block that stores data used for the techniques described herein. The memory 17 may be separate or part of the controller 16. In addition, logic instructions for performing an adaptive channel estimation process 100 may be stored in the memory 17 for execution by the controller 16. The controller 16 may be configured to generate a beamforming weight vector using the channel estimate information that is produced by the adaptive channel estimation process 100. The beamforming weight vector is supplied to the transmitter 12.

The functions of the controller 16 may be implemented by logic encoded in one or more tangible media (e.g., embedded logic such as an application specific integrated circuit, digital signal processor instructions, software that is executed by a processor, etc.), wherein the memory 17 stores data used for the computations described herein (and/or to store software or processor instructions that are executed to carry out the computations described herein). Thus, the process 100 may be implemented with fixed logic or programmable logic (e.g., software/computer instructions executed by a processor) and the controller 16 may be a programmable processor, programmable digital logic (e.g., field programmable gate array) or an application specific integrated circuit (ASIC) that comprises fixed digital logic, or a combination thereof.

In current and next generation wireless communication systems, high transmission rates are required to support both stationary and mobile communication devices. As a result, channel estimation for coherent detection of received signals is important. In most of these systems, such as WiMAX and 3G Long Term Evolution (LTE) systems, pilots are inserted in some specific tones or subcarriers of subchannels that also contain data in order to allow a receiving device to estimate or track channel state information. Generally, the channel time response or frequency response can be estimated based on the pilots if enough pilots are used in individual transmissions. However, in certain practical applications, such as traffic transmissions with a small burst size or traffic transmissions with dedicated pilots, there are only a few pilots available in the transmission for channel estimation.

To solve this problem, the adaptive channel estimation process 100 is configured to dynamically select the most appropriate one of a plurality of channel estimation schemes based on some preliminary or pre-processing of a transmission. Each of these schemes is for different channel conditions such as different frequency sensitivity or selectivity of the channel, or different Doppler or time-varying conditions of the channel.

Figure 3:
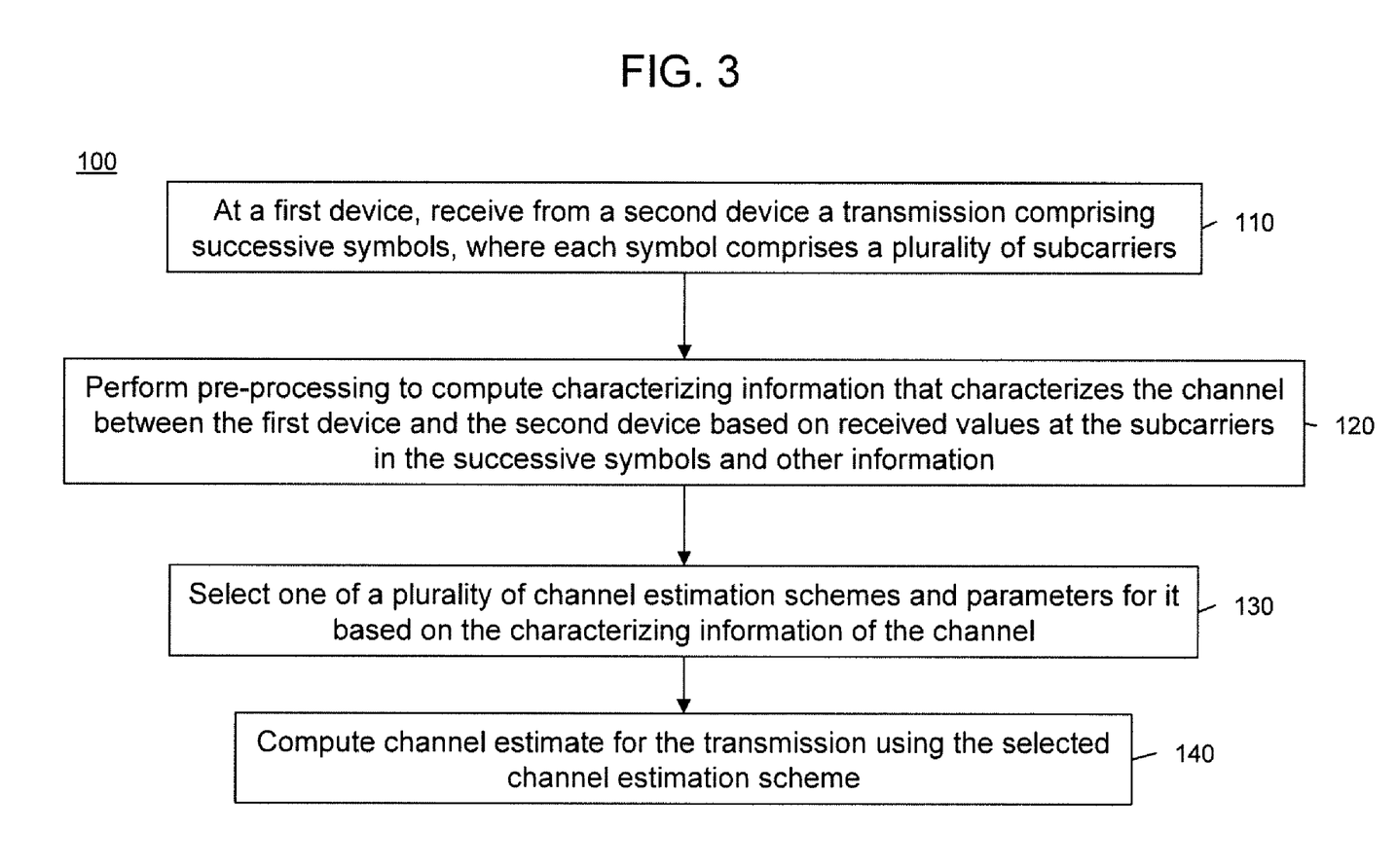
FIG. 3 is an example of a flow chart of the adaptive channel estimation process.

With reference to FIG. 3, an example of a flow chart for the adaptive channel estimation process 100 is now described. At 110, the first device receives from the second device a transmission that comprises successive symbols, where each symbol comprises a plurality of subcarriers. At 120, preliminary or pre-processing of the received transmission is performed to compute channel characterizing information that characterizes the channel between the first device and the second device based on received values at the subcarriers in the successive symbols of the transmission and possibly other information. An example of one technique for preliminary or pre-processing at 120 to compute the channel characterizing information is described in further detail hereinafter in connection with FIGS. 4 and 5. At 130, one of a plurality of channel estimation schemes and parameters for the selected channel estimation scheme (if applicable) are selected based on the channel characterizing information computed at 120. Thus, the device that performs the process 100 also is configured to perform each of a plurality of channel estimation schemes. Examples of different channel estimation schemes for different channel conditions are described hereinafter. At 140, the channel estimate is computed for the transmission using the selected channel estimation scheme and any applicable parameters selected therefore at 130.

The process 100 may be performed for each transmission that the first device receives from the second device. The process 100 can dynamically select the best channel estimation scheme on a transmission by transmission basis depending on the current conditions of the channel. In this sense, the process 100 is dynamically adaptable to changing conditions of the wireless channel. The other information referred to at 120 that may be used to compute the channel characterizing information for a current received transmission may based further on channel characterizing or channel estimate information computed for one or more previously received transmissions, where the previous transmissions comprise subcarriers that may or may not be in the same frequency band as that of the current transmission. Alternatively, the pre-processing computation at 120 and the channel estimation computation at 140 may be performed for two or more received transmissions that are considered together as a single transmission or burst.

As explained above, the channel estimation techniques described herein are useful when the transmission is a relatively short burst that has a minimal number of pilot subcarriers that can be used to derive channel information. However, these techniques are not meant to be limited to such a situation and they can be applied to transmissions with more pilot subcarriers.

Figure 4:
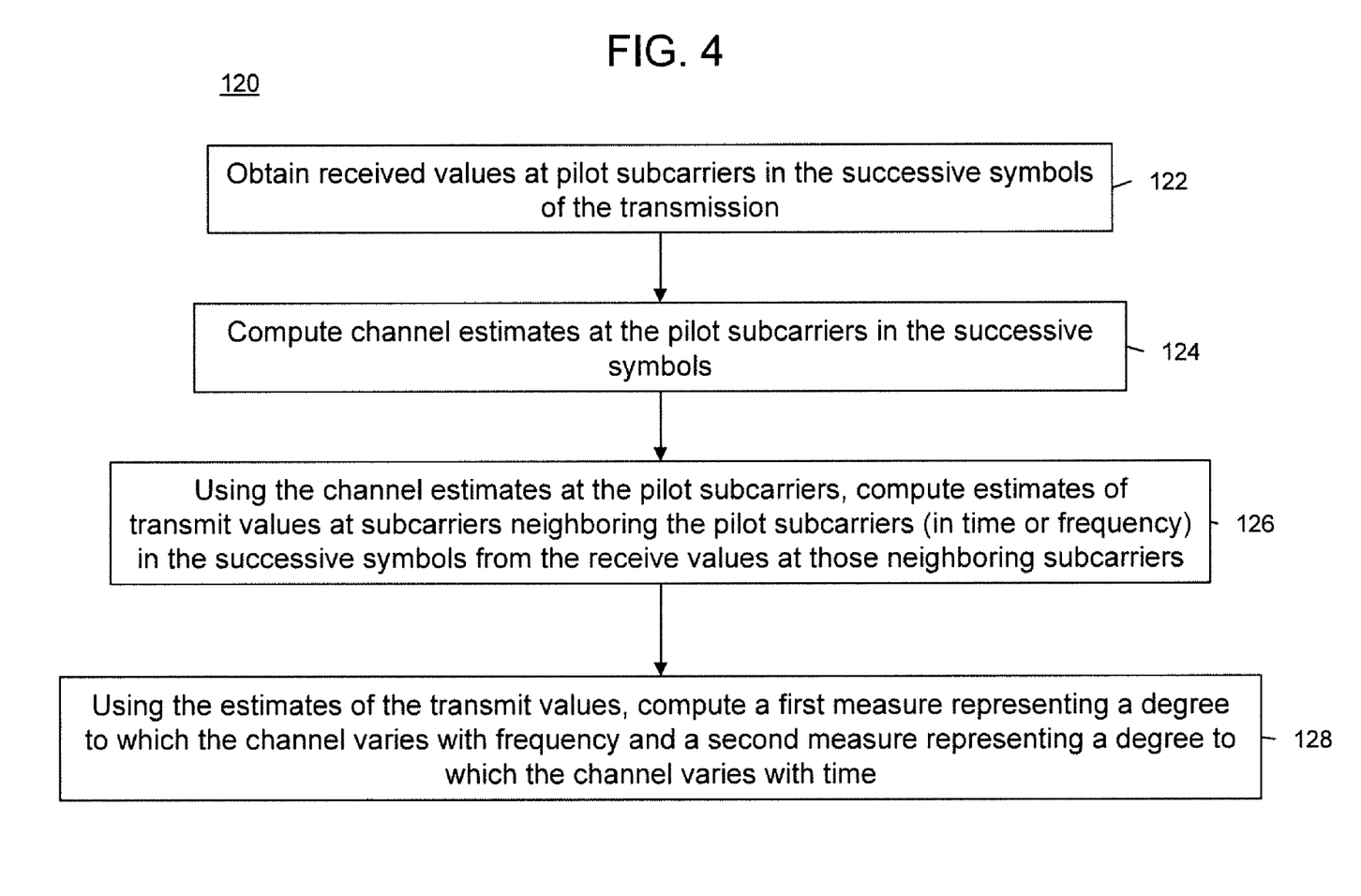
FIG. 4 is an example of a flow chart showing a technique for computing channel characterization information that is useful in the adaptive channel estimation process.
Figure 5:
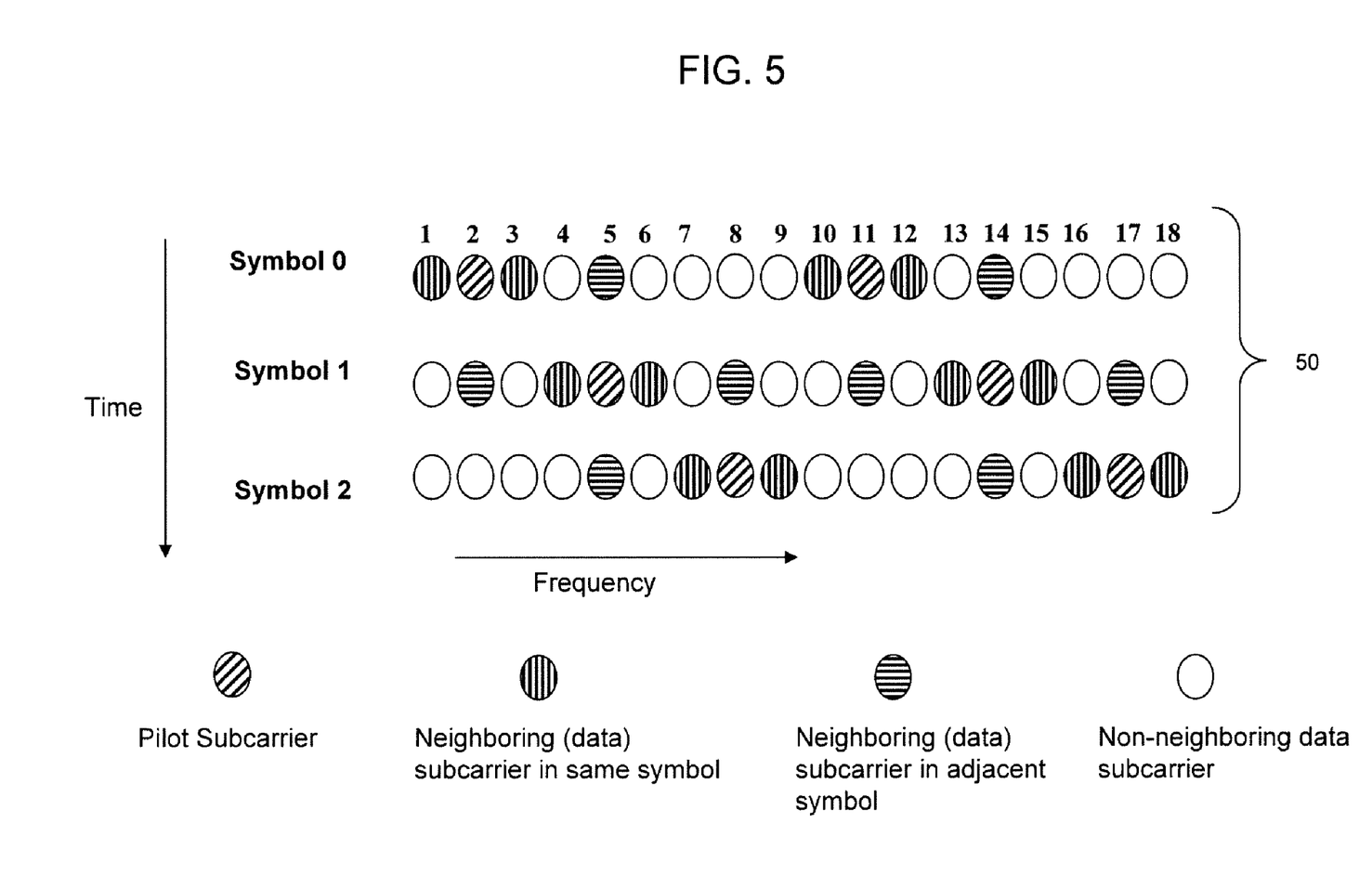
FIG. 5 is a diagram showing an arrangement of frequency subcarriers for multiple symbols of a transmission and illustrating an example of a technique for generating the channel characterization information.

Turning now to FIG. 4, with reference also to FIG. 5, an example of the preliminary or pre-processing function is described. FIG. 5 illustrates an example of a transmission 50 that contains multiple successive (e.g., consecutive in time) symbols. Each symbol comprises a plurality of subcarriers or tones. Each subcarrier is at a different frequency. FIG. 5 shows an example where the three symbols, Symbol 0, Symbol 1 and Symbol 2, make up one slot in which the subcarriers are grouped or permutated according techniques employed in the adaptive coding and modulation (AMC) feature used in a WiMAX system. This is meant to be by way of example only.

Each symbol comprises 18 subcarriers, numbered 1-18 as shown in FIG. 5. For reasons explained above with respect to high data rate applications, there are a minimal number of pilot subcarriers in the transmission. For example, Symbol 0 has a pilot subcarrier at subcarriers 2 and 11, Symbol 1 has a pilot subcarrier at subcarriers 5 and 14 and Symbol 2 has a pilot subcarrier at subcarriers 8 and 17. Since there is a minimal number of pilot subcarriers in the transmission 50, techniques are employed to derive channel estimates at other (data) subcarriers using the pilot subcarriers as reference data points.

As shown in FIG. 4, the pre-processing function 120 begins with obtaining received values at the pilot subcarriers in the successive symbols of the transmission. Since the transmit values at the pilot subcarriers are known in advance to the receiving device (by definition of a pilot signal), the channel estimates may be computed at the pilot subcarriers in the successive symbols at 124. For example, the channel estimates at pilot subcarriers may be computed as:

$$\hat{h}_{0,2} = \frac{y_{0,2}}{x_{0,2}}, \hat{h}_{0,11} = \frac{y_{0,11}}{x_{0,11}}, \hat{h}_{1,5} = \frac{y_{1,5}}{x_{1,5}}, \hat{h}_{1,14} = \frac{y_{1,14}}{x_{1,14}},$$
$$\hat{h}_{2,8} = \frac{y_{2,8}}{x_{2,8}}, \hat{h}_{2,17} = \frac{y_{2,17}}{x_{2,17}}, h_{0,m},$$

where $h_{n,m}$ denotes the channel information of the m-th subcarrier in symbol n (for n=0, 1 and 2), $y_{n,m}$ denotes the received value at the m-th subcarrier in symbol n and $x_{n,m}$ represents the transmit value at the m-th subcarrier in symbol n. Thus, $x_{0,2}, x_{0,11}, x_{1,5}, x_{1,14}, x_{2,8}$ and $x_{2,17}$ are the transmit values at the pilot subcarriers in Symbols 0, 1 and 2, and are known a priori to the receiving device. The received values at the subcarriers are derived from the received signal.

Next, at 126, using the channel estimates at the subcarriers of pilots, estimates of the transmit values are computed at those data subcarriers that are next to or neighboring (in frequency or time) the pilot subcarriers in the successive symbols from the receive values at those neighboring data subcarriers. For example, as shown in FIG. 5, the neighboring subcarriers for the pilot subcarrier at subcarrier 2 in Symbol 0 are the data subcarriers 1 and 3 of Symbol 0 and data subcarrier 2 of Symbol 1. Likewise, the neighboring subcarriers for the pilot subcarrier at subcarrier 11 of Symbol 0 are data subcarriers 10 and 12 of Symbol 0 and data subcarrier 11 of Symbol 1. The neighboring subcarriers for the pilot subcarrier at subcarrier 5 of Symbol 1 are the data subcarrier 5 of Symbol 5, data subcarriers 4 and 6 of Symbol 1 and data subcarrier 5 of Symbol 2. Similarly, the neighboring subcarriers for the pilot subcarrier at subcarrier 14 of Symbol 1 are the data subcarrier 14 of Symbol 0, data subcarriers 13 and 15 of Symbol 1 and data subcarrier 14 of Symbol 2. The neighboring data subcarriers for the pilot subcarriers of Symbol 2 are shown in FIG. 5.

The transmit values at the neighboring data subcarriers are thus computed as follows:

$$\hat{x}_{0,1} = \frac{y_{0,1}}{\hat{h}_{0,2}}, \hat{x}_{1,2} = \frac{y_{1,2}}{\hat{h}_{0,2}}, \hat{x}_{0,3} = \frac{y_{0,3}}{\hat{h}_{0,2}},$$
$$\hat{x}_{0,5} = \frac{y_{0,5}}{\hat{h}_{1,5}}, \hat{x}_{1,4} = \frac{y_{1,4}}{\hat{h}_{1,5}}, \hat{x}_{1,6} = \frac{y_{1,6}}{\hat{h}_{1,5}}, \hat{x}_{2,5} = \frac{y_{2,5}}{\hat{h}_{1,5}}$$
$$\hat{x}_{1,8} = \frac{y_{1,8}}{\hat{h}_{2,8}}, \hat{x}_{2,7} = \frac{y_{2,7}}{\hat{h}_{2,8}}, \hat{x}_{2,9} = \frac{y_{2,9}}{\hat{h}_{2,8}},$$
$$\hat{x}_{0,10} = \frac{y_{0,10}}{\hat{h}_{0,11}}, \hat{x}_{0,12} = \frac{y_{0,12}}{\hat{h}_{0,11}}, \hat{x}_{1,11} = \frac{y_{1,11}}{\hat{h}_{0,11}},$$
$$\hat{x}_{0,14} = \frac{y_{0,14}}{\hat{h}_{1,14}}, \hat{x}_{1,13} = \frac{y_{1,13}}{\hat{h}_{1,14}}, \hat{x}_{1,15} = \frac{y_{1,15}}{\hat{h}_{1,14}}, \hat{x}_{2,14} = \frac{y_{2,14}}{\hat{h}_{1,14}}$$
$$\hat{x}_{1,17} = \frac{y_{1,17}}{\hat{h}_{2,17}}, \hat{x}_{2,16} = \frac{y_{2,16}}{\hat{h}_{2,17}}, \hat{x}_{2,18} = \frac{y_{2,18}}{\hat{h}_{2,17}},$$

For example, as shown in the equations above, since subcarrier 1 of Symbol 0 is next to the pilot subcarrier at subcarrier 2 of Symbol 0, then an estimate of the transmit value at subcarrier 1 of Symbol 0, $\hat{x}_{0,1}$ is computed from the received value at subcarrier 1 of Symbol 0, $y_{0,1}$, and the channel estimate at the pilot subcarrier 2 of Symbol 0, $\hat{h}_{0,2}$, which was computed at 124 according to the equation $$\hat{h}_{0,2} = \frac{y_{0,2}}{x_{0,2}}.$$

Similar computations are made using the channel information at the pilot subcarriers for computing the transmit values at the neighboring data subcarriers associated with each of the pilot subcarriers in the symbols of the transmission.

At 128, measures are computed that characterize the channel between the two devices based on the estimates of the transmit values at the neighboring data subcarriers. For example, a first measure is computed that represents a degree to which the channel varies with frequency and a second measure is computed that represents a degree to which the channel varies with time.

More specifically, at 128, the first measure is computed as follows. The first measure representing the frequency variation of the channel is based on distances between the transmit value estimates at the different data subcarriers (neighboring subcarriers) in the same symbol computed at 126 to corresponding symbol constellation points. For example, the first measure is based on the estimated transmit values $\hat{x}_{n,m}$ in the same symbol (at those subcarriers with vertical cross hatching in FIG. 5) such that the first measure $V_f$ is computed as:

$$V_f = \text{mean}(d_{0,1}, d_{0,3}, d_{0,10}, d_{0,12}, d_{1,4}, d_{1,6}, d_{1,13}, d_{1,15}, d_{2,7}, d_{2,9}, d_{2,16}, d_{2,18}),$$

where $d_{n,m}$ is the minimum distance of estimated transmit values $\hat{x}_{n,m}$ at the neighboring subcarriers within the same symbol to the symbol constellation points, i.e., $$d_{n,m} = \min_k(|\hat{x}_{n,m} - e_k|),$$

and where $e_k \in \{e_1, \ldots, e_K\}$ is the set of symbol constellation points for the transmitted symbols. This distance measure is dependent on the type of modulation scheme used for the symbols, e.g., quadrature phase shift keying (QPSK), quadrature amplitude modulation (QAM), etc.

Similarly, at 128, the second measure is computed as follows. The second measure is based on distances between the transmit value estimates at neighboring subcarriers of the pilot subcarriers in different symbols with respect to the corresponding symbol constellation points. For example, the second measure is based on the estimated transmit values $\hat{x}_{n,m}$ in the different symbols (at those subcarriers with horizontal cross hatching in FIG. 5) such that the second measure $V_t$ is computed as:

$$V_t = \text{mean}(d_{1,2}, d_{0,5}, d_{2,5}, d_{1,8}, d_{1,11}, d_{0,14}, d_{2,14}, d_{1,17}),$$

again where $d_{n,m}$ is the minimum distance of the estimated transmit values $\hat{x}_{n,m}$ at the neighboring subcarriers in different symbols to the symbol constellation points, i.e., $$d_{n,m} = \min_k(|\hat{x}_{n,m} - e_k|),$$

where $e_k \in \{e_1, \ldots, e_K\}$ is the set of symbol constellation points for the transmitted symbols.

In the example of FIG. 4 where the channel characterizing information comprises the first and second measures, an example of the selection function 130 of the process 100 (FIG. 3) is described with reference to FIG. 6. The selection function 130 shown in FIG. 6 presumes that there are two channel estimation schemes, Scheme 1 and Scheme 2. Channel estimation scheme 1 is suitable for a slowly changing (over time) channel, such as is the case where both devices on the link are substantially stationary with respect to each other. Channel estimation scheme 2 is suitable for a channel that does not vary substantially with frequency (i.e., has low frequency selectivity) and is also not sensitive to relative movement between the two devices on the link.

At 132, the channel characterizing information comprising the first and second measures $V_f$ and $V_t$ are obtained as explained above. At 134, the first and second measures are compared with each other. When $V_t < V_f$, then channel estimation scheme 1 is selected as shown at 136. Otherwise, channel estimation scheme 2 is selected as shown at 138. In addition, depending on the values for the first and/or second measures, one or more parameters for channel estimation scheme 2 may be selected when invoking channel estimation scheme 2. For example, the order of the curve fitting model used in the channel estimation scheme 2 may be selected depending on the first and second measures. Thus, the process 130 involves selecting a channel estimation scheme depending on which of the first and second measures dominates the other. When the frequency variation of the channel dominates the time variation of the channel, the first channel estimation scheme is selected. Conversely, when the time variation of the channel dominates the frequency variation of the channel, the second channel estimation scheme is selected.

Figure 6:
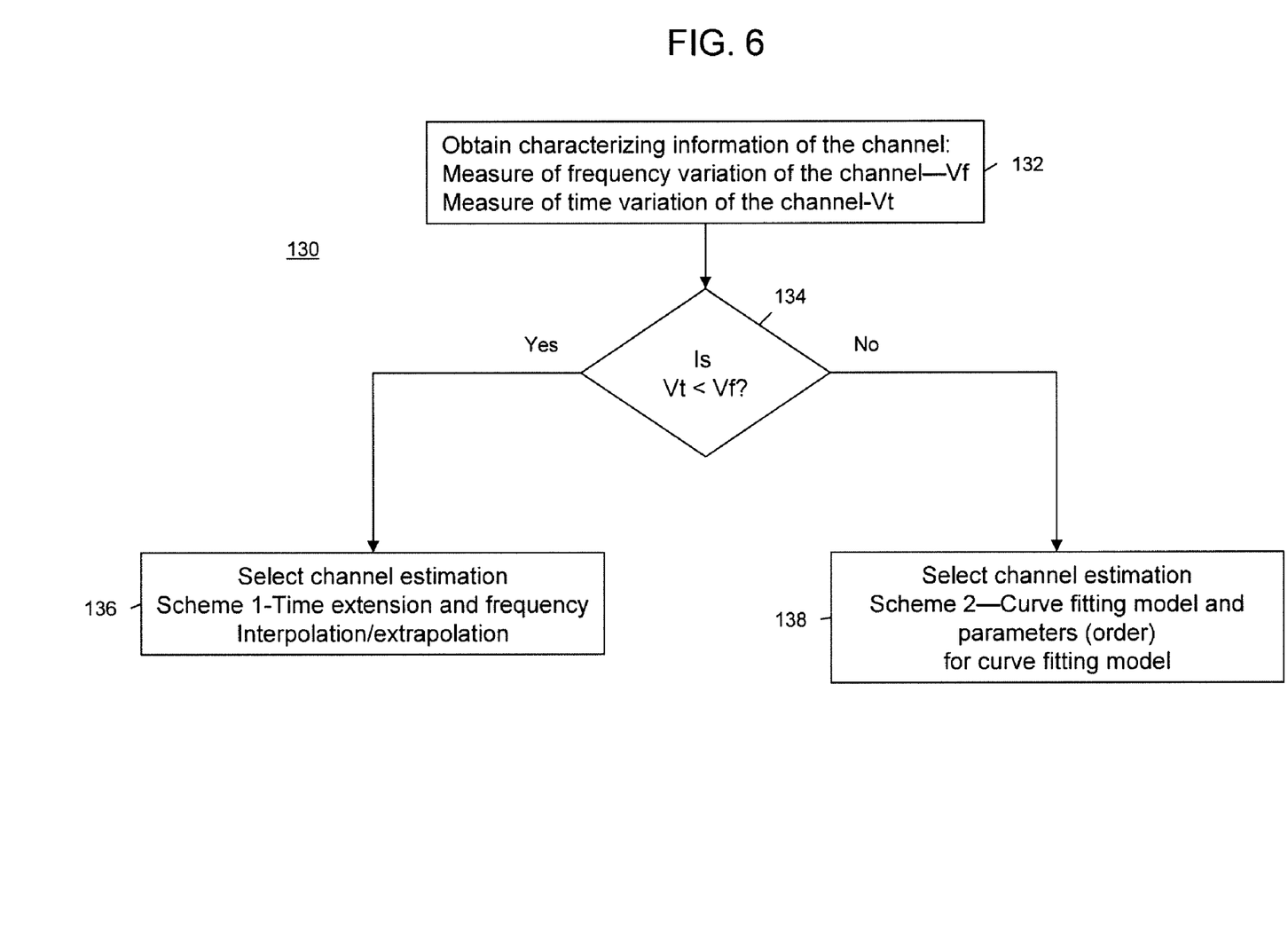
FIG. 6 is flow chart for a channel estimation selection function useful in the adaptive channel estimation process.

FIG. 6 is meant to be an example only. Other selection techniques may be useful, such as comparing the first and second measures to one or more respective thresholds, and selecting a channel estimation scheme depending on the relative values of the first and second measures with respect to the thresholds. Moreover, such a threshold-based selection technique may be useful in order to select an order (first order, second order, third order, fourth order, etc.) of the curve fitting model used when invoking channel estimation scheme 2 depending on how the first and second measures compare to one or more respective thresholds.

Figure 7:
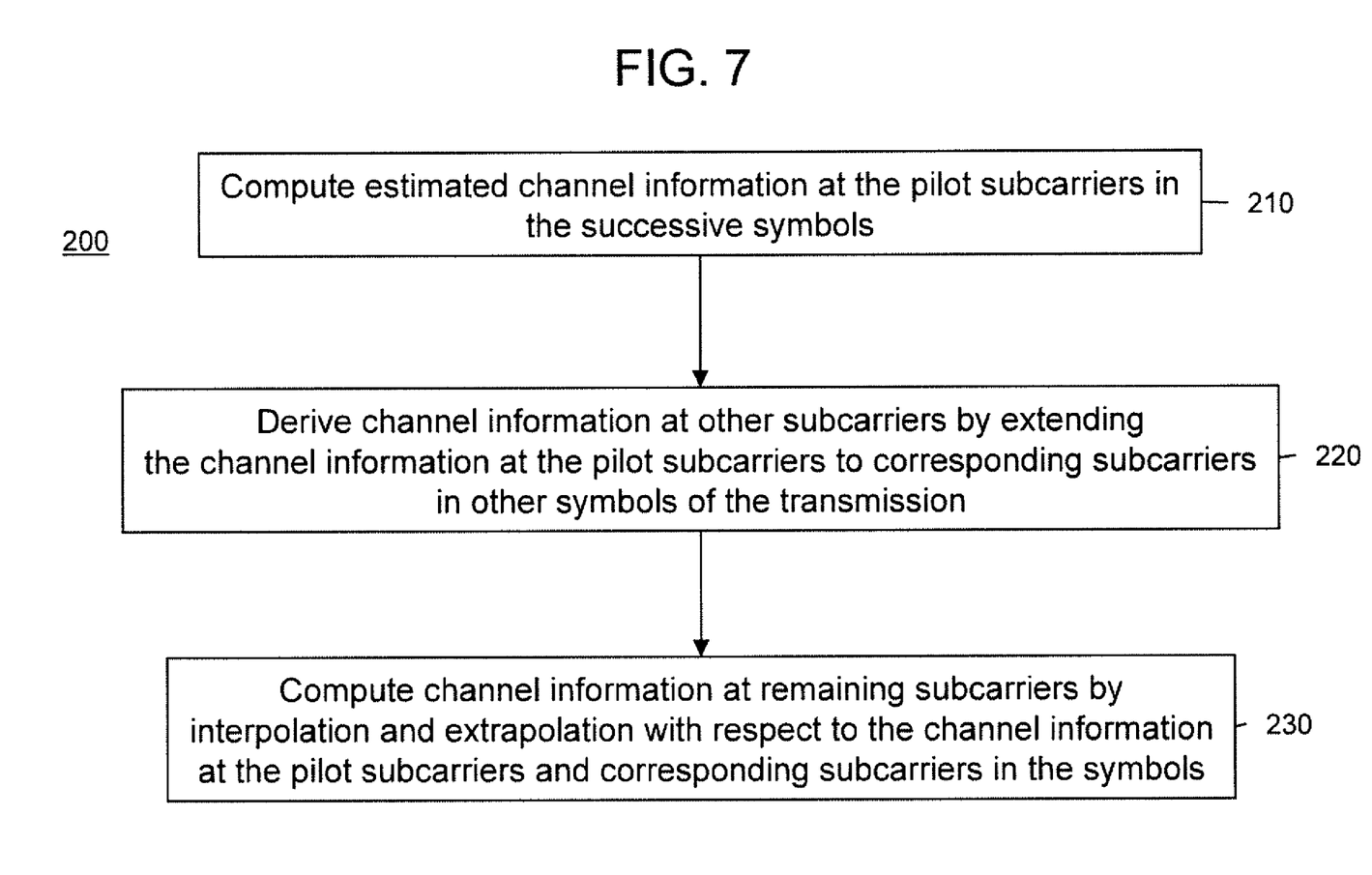
FIG. 7 is an example of a flow chart for a first channel estimation process that is useful for channel conditions that have minimal variations with time.
Figure 8:
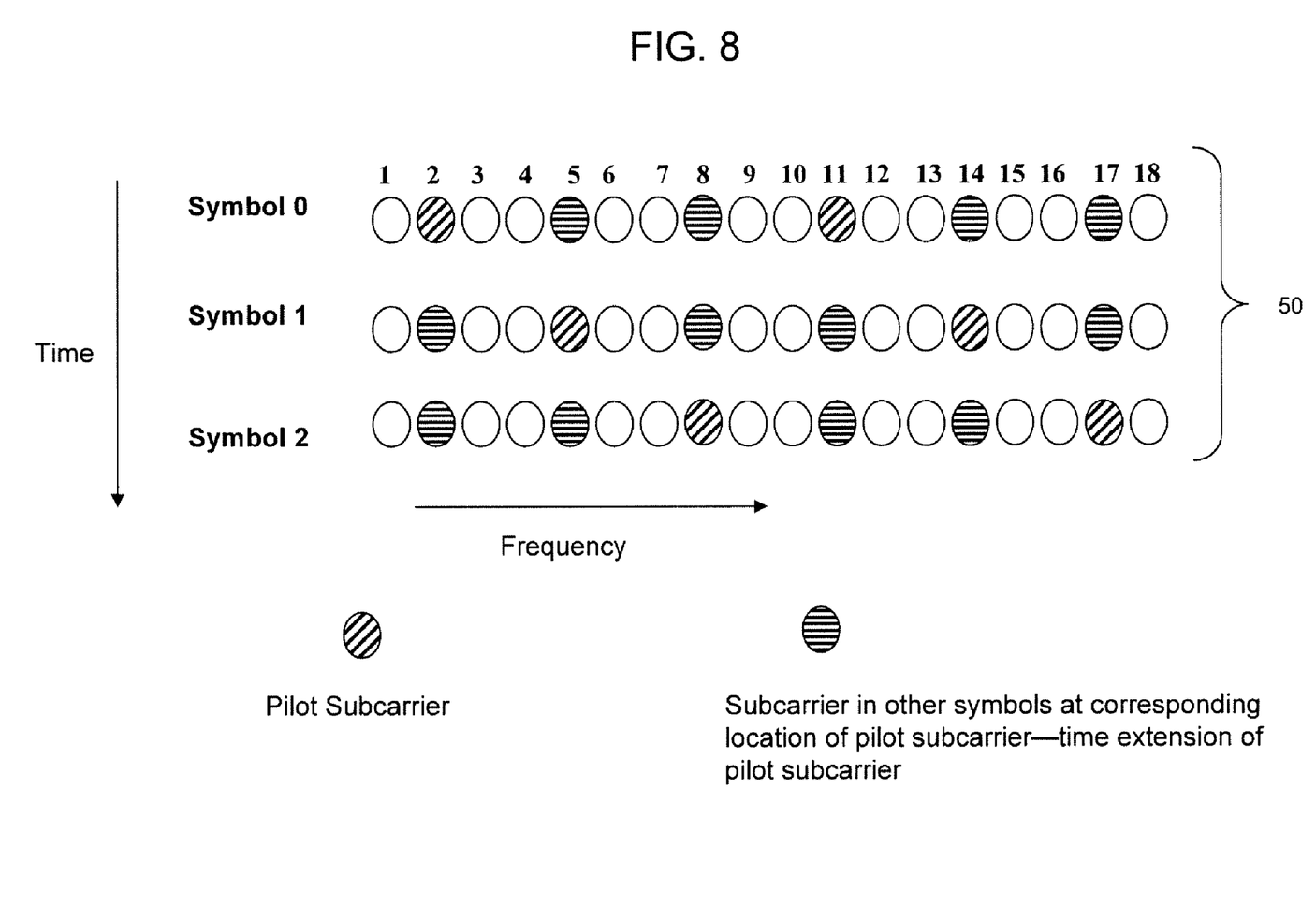
FIG. 8 is a diagram showing an arrangement of frequency subcarriers for multiple symbols in a transmission and illustrating operation of the first channel estimation process.

Turning now to FIG. 7, an example of a flow chart for a first channel estimation scheme, i.e., channel estimation scheme 1, is now described. Reference is also made to FIG. 8 for a description of the first channel estimation scheme 1. The first channel estimation scheme, shown generally at reference numeral 200 in FIG. 7, is designed for channel conditions that do not vary substantially with time. At 210, the estimated channel information is computed at the pilot subcarriers for symbols of a received transmission 50. As shown in FIG. 8, this corresponds to the pilot subcarriers at subcarriers 2 and 11 of Symbol 0, pilot subcarriers at subcarriers 5 and 14 of Symbol 1, and pilot subcarriers at subcarriers 8 and 17 of Symbol 2. Thus, the channel estimates at the pilot subcarriers computed at 210 are:

$$\hat{h}_{0,2} = \frac{y_{0,2}}{x_{0,2}}, \hat{h}_{0,11} = \frac{y_{0,11}}{x_{0,11}}, \hat{h}_{1,5} = \frac{y_{1,5}}{x_{1,5}}, \hat{h}_{1,14} = \frac{y_{1,14}}{x_{1,14}},$$

$$\hat{h}_{2,8} = \frac{y_{2,8}}{x_{2,8}}, \hat{h}_{2,17} = \frac{y_{2,17}}{x_{2,17}},$$

where $x_{0,2}, x_{0,11}, x_{1,5}, x_{1,14}, x_{2,8}$ and $x_{2,17}$ are transmitted values at the corresponded pilot subcarriers noted above. At 220, channel information at other subcarriers in the symbols of the transmission is derived by extending in time the channel information at the pilot subcarriers to corresponding data subcarriers in other symbols of the transmission. That is, the channel information at subcarrier 2 of Symbol 1 and at subcarrier 2 of Symbol 2 is set to be the same as the computed channel information at the pilot subcarrier 2 of Symbol 0. Similarly, the channel information at subcarrier 5 of Symbol 0 and at subcarrier 5 of Symbol 2 is set to be the same as the computed channel information at the pilot subcarrier 5 of Symbol 1, and so on. FIG. 8 illustrates the data subcarriers (with horizontal cross hatching) in other symbols whose channel information is derived from the channel information at the corresponding pilot subcarrier of another symbol. The derived channel information at the other subcarriers are as follows.

$$\hat{h}_{1,2} = \hat{h}_{0,2}, \hat{h}_{2,2} = \hat{h}_{0,2}, \hat{h}_{1,11} = \hat{h}_{0,11}, \hat{h}_{2,11} = \hat{h}_{0,11}$$

$$\hat{h}_{0,5} = \hat{h}_{1,5}, \hat{h}_{2,5} = \hat{h}_{1,5}, \hat{h}_{0,14} = \hat{h}_{1,14}, \hat{h}_{2,14} = \hat{h}_{1,14}$$

$$\hat{h}_{0,8} = \hat{h}_{3,8}, \hat{h}_{2,8} = \hat{h}_{3,8}, \hat{h}_{0,17} = \hat{h}_{3,17}, \hat{h}_{2,17} = \hat{h}_{3,17}$$

Next, at 220, the channel information at the remaining subcarriers of the symbols in the transmission is computed using interpolation and extrapolation with respect the channel information for those subcarriers computed or determined up to this point. That is, extrapolation and interpolation is used to compute the channel information at the remaining subcarriers from the channel information $\hat{h}_{0,2}, \hat{h}_{0,5}, \hat{h}_{0,8}, \hat{h}_{0,11}, \hat{h}_{0,14}, \hat{h}_{0,17}$; $\hat{h}_{1,2}, \hat{h}_{1,5}, \hat{h}_{1,8}, \hat{h}_{1,11}, \hat{h}_{1,17}$ and $\hat{h}_{2,2}, \hat{h}_{2,5}, \hat{h}_{2,8}, \hat{h}_{2,14}, \hat{h}_{2,17}$ for Symbols 0, 1 and 2 of the transmission.

Figure 9:
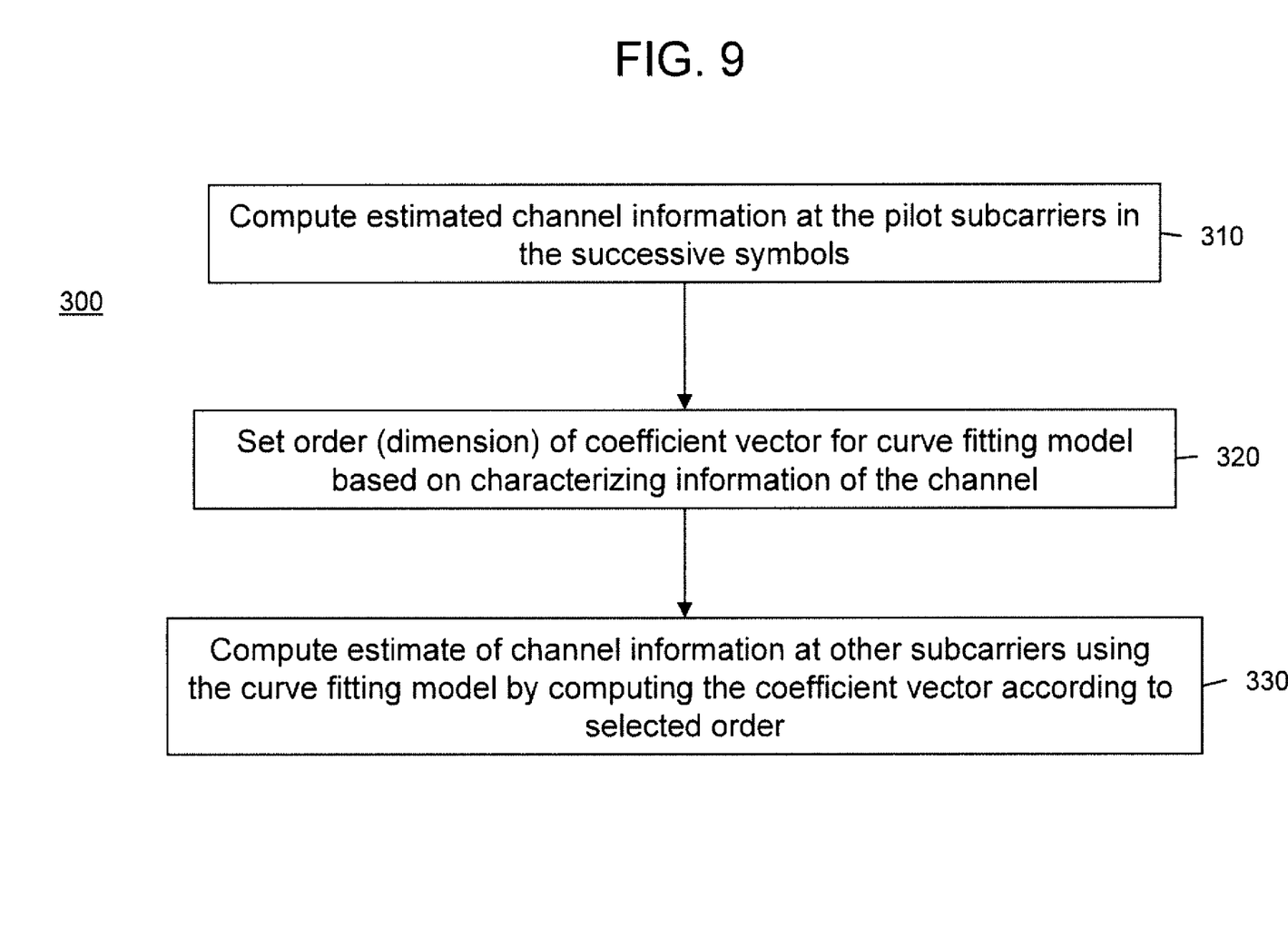
FIG. 9 is an example of a flow chart for a second channel estimation process that is useful for channel conditions that have minimal variations with frequency.

Turning now to FIG. 9, an example of a flow chart for a second channel estimation scheme, i.e., channel estimation scheme 2, is now described. This channel estimation scheme, shown generally at 300 in FIG. 9, involves the use of a curve fitting model to derive the channel estimation at subcarriers other than the pilot subcarriers for symbols of a transmission. At 310, the estimated channel information at the pilot subcarriers in the symbols is computed in the same manner as described above in connection with 210 of FIG. 7 and 124 of FIG. 4. At 320, the order (dimension) of the curve fitting model is set based on the characterizing information (first and second measures) as described above in connection with 138 in FIG. 6. This is explained further hereinafter.

At 330, the estimate of the channel information at other subcarriers is computed using a curve fitting model (at the selected order). This involves computing a curve fitting coefficient vector at the selected order. An example of a second order (two-dimensional) curve fitting model is $h = c_0 + c_1 f + c_2 t + c_3 f^2$, where f is frequency index variable, and t is the time (symbol) index variable.

The following is an example of a two-dimensional (second order) curve fitting channel estimation technique. Given that the channel information at the pilot subcarriers can be computed, i.e., $[\hat{h}_{0,2}, \hat{h}_{1,5}, \hat{h}_{2,8}, \hat{h}_{0,11}, \hat{h}_{1,14}, \hat{h}_{3,17}]$, a curve fitting coefficient vector C, $C=[c_0 \; c_1 \; c_2 \; c_3]^T$, is computed for the two-dimensional fitting curve $h=c_0+c_1 f+c_2 t+c_3 f^2$, such that $C=B^{-1}Z$, where B is a 4×4 matrix and Z is a 4×1 vector. The B and Z matrices may be generated according to the following pseudo-code.

```
set   B = zeros(4,4)
      Z = zeros(4,1)
      x=[2 5 8 11 14 17];
      y=[1 2 3];
      for m=1:6
        for n=1:3
          if (mod(m,3)= =1 & n= =1) or (mod(m,3)= =2 &
            n= =2) or (mod(m,3)= =0 & n= =3)
              X_0 = [1 x(m) y(n) x^2 (m)];
              B = B + X_0'X_0
              Z = Z + pilot(m)X_0'
          end
        end
      end
```

Once the curve fitting coefficient vector is computed, then the channel information at the other subcarriers in the symbols of the transmission may be computed from the equation $\hat{h}_{n,m}=[1 \; m \; n \; m^2]C$, where m and n are the subcarrier and symbol indices, respectively, in the current transmission.

The curve fitting technique described above can be extended to a higher order computation depending on the channel characterization information. For example, a third order computation would be $h=c_0+c_1 f+c_2 t+c_3 f^2+c_4 f^3$, and a fourth order computation would be $h=c_0+c_1 f+c_2 t+c_3 f^2 c_4 f^3+c_5 f^4$, and so on. The computation of the coefficient vector C would then be expanded to higher matrix computations involving the B and Z matrices referred to above. Thus, if the channel characterization information indicates that the channel is varying rapidly (in time and/or frequency), a parameter, e.g., the order, of the curve fitting computation may be adjusted or selected, e.g., increased, to account for such faster channel variations.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
at a first device, receiving a wireless transmission from a second device, wherein the transmission comprises a plurality of successive symbols each of which comprises a plurality of subcarriers;
computing channel characterizing information for a wireless channel between the first device and the second device, wherein the channel characterizing information comprises a first measure and a second measure for characterizing the channel, the first measure being computed based on a distance between transmit value estimates at neighboring data subcarriers of the successive symbols and the second measure being computed based on a distance between transmit value estimates at neighboring pilot subcarriers of the successive symbols;
comparing the first measure with the second measure;
selecting one of a plurality of channel estimation schemes based on the comparing; and
computing an estimate of channel information for the wireless channel using the selected one of the plurality of channel estimation schemes.

2. The method of claim 1, and further comprising selecting parameters for the selected one of the plurality of channel estimation schemes, and wherein computing comprises computing the estimate of the channel information using the selected parameters for the selected one of the plurality of channel estimation schemes.

3. The method of claim 1, wherein computing channel characterizing information comprises computing the first measure to represent a degree to which the channel varies with frequency and the second measure to represent a degree to which the channel varies with time.

4. The method of claim 3, wherein selecting comprises selecting a first channel estimation scheme when the first and second measures indicate that the channel has minimal variation with time and selecting a second channel estimation scheme when the first and second measures indicate that the channel has minimal variation with frequency.

5. The method of claim 4, wherein computing the estimate of the channel information comprises using the first channel estimation scheme that comprises computing channel estimates at pilot subcarriers in the symbols of the transmission, setting the channel estimates for subcarriers at positions corresponding to the pilot subcarriers in other symbols of the transmission equal to the channel estimates at the pilot subcarriers, and computing channel estimates at remaining subcarriers in the symbols of the transmission by interpolation and extrapolation with respect to the channel estimates at the pilot subcarriers and to channel estimates for the subcarriers at positions corresponding to the pilot subcarriers in other symbols.

6. The method of claim 5, wherein computing the estimate of the channel information comprises using the second channel estimation scheme that comprises computing channel estimates at pilot subcarriers in the symbols of the transmission, and computing channel estimates at other subcarriers in the symbols using a curve fitting model.

7. The method of claim 6, wherein computing channel estimates at other subcarriers using the curve fitting model comprises computing coefficients for a curve fitting vector that is applied to the channel estimates at the pilot subcarriers.

8. The method of claim 7, and further comprising selecting an order of the curve fitting vector based on the first and second measures.

9. The method of claim 4, wherein computing the channel characterizing information comprises computing channel estimates at pilot subcarriers in the successive symbols of the transmission based on receive values at the pilot subcarriers, computing estimates of transmit values at neighboring subcarriers to the pilot subcarriers in the symbols, wherein computing the first measure is based on distances between the transmit value estimates at different subcarriers in the same symbol to corresponding symbol constellation points and wherein computing the second measure is based on distances between the transmit value estimates at neighboring subcarriers of the pilot subcarriers in different symbols to corresponding symbol constellation points.

10. The method of claim 1, wherein computing the channel characterizing information for a current received transmission is based further on channel characterizing information or channel estimate information computed for one or more previously received transmissions.

11. An apparatus comprising:
one or more antennas that detect wireless radio frequency energy;
a radio receiver that is configured to connect to the one or more antennas and to generate signals representing a received wireless radio frequency transmission from another communication device, wherein the transmission comprises a plurality of successive symbols each of which comprises a plurality of subcarriers;
a processor configured to be coupled to the radio receiver, wherein the processor is configured to:
compute channel characterizing information for a wireless channel with respect to the other communication device, wherein the channel characterizing information comprises a first measure and a second measure for characterizing the channel, the first measure being computed based on a distance between transmit value estimates at neighboring data subcarriers of the successive symbols and the second measure being computed based on a distance between transmit value estimates at neighboring pilot subcarriers of the successive symbols;
compare the first measure and the second measure;
select one of a plurality of channel estimation schemes based on a result of comparing the first measure and the second measure; and
compute an estimate of channel information for the wireless channel using the selected one of the plurality of channel estimation schemes.

12. The apparatus of claim 11, wherein the processor is configured to compute the channel characterizing information by computing channel estimates at pilot subcarriers in the successive symbols of the transmission based on received values at the pilot subcarriers, computing estimates of transmit values at neighboring subcarriers to the pilot subcarriers in the symbols, and computing measures of frequency variation and time variation of the channel using the channel estimates at the pilot subcarriers and the estimates of the transmit values at neighboring subcarriers.

13. The apparatus of claim 12, wherein the processor is configured to select a channel estimation scheme by selecting a first channel estimation scheme when the first and second measures indicate that the channel has minimal variation with time and selecting a second channel estimation scheme when the first and second measures indicate that the channel has minimal variation with frequency.

14. The apparatus of claim 13, wherein the processor is configured to compute the estimate of the channel information using the first channel estimation scheme by computing channel estimates at pilot subcarriers in the symbols of the transmission, setting the channel estimates for subcarriers at positions corresponding to the pilot subcarriers in other symbols of the transmission equal to the channel estimates at the pilot subcarriers, and computing channel estimates at remaining subcarriers in the symbols of the transmission by interpolation and extrapolation with respect to the channel estimates at the pilot subcarriers and to channel estimates for the subcarriers at positions corresponding to the pilot subcarriers in other symbols.

15. The apparatus of claim 13, wherein the processor is configured to compute the estimate of the channel information using the second channel estimation scheme by computing channel estimates at pilot subcarriers in the symbols of the transmission, and computing channel estimates at other subcarriers in the symbols using a curve fitting model.

16. The apparatus of claim 15, wherein the processor is configured to select an order of the curve fitting model based on the first and second measures of the channel characterizing information.

17. One or more non-transitory computer readable storage media encoded with software comprising computer executable instructions and when the software is executed operable to:
compute channel characterizing information for a wireless channel between a first communication device and a second communication device, wherein the channel characterizing information comprises a first measure and a second measure for characterizing the channel, the first measure being computed based on a distance between transmit value estimates at neighboring data subcarriers of successive symbols received in a radio frequency transmission received at the first communication device from the second communication device and the second measure being computed based on a distance between transmit value estimates at neighboring pilot subcarriers of the successive symbols; compare the first measure and the second measure;
select one of a plurality of channel estimation schemes based on a result of comparing the first measure and the second measure; and
compute an estimate of channel information for the wireless channel using the selected one of the plurality of channel estimation schemes.

18. The non-transitory computer readable storage media of claim 17, wherein the instructions operable to compute the channel characterizing information comprise instructions operable to compute channel estimates at pilot subcarriers in the successive symbols of the transmission based on received values at the pilot subcarriers, compute estimates of transmit values at neighboring subcarriers to the pilot subcarriers in the symbols, and compute measures of frequency variation and time variation of the channel using the channel estimates at the pilot subcarriers and the estimates of the transmit values at neighboring subcarriers.

19. The non-transitory computer readable storage media of claim 18, wherein the instructions operable to select comprise instructions operable to select one of the plurality of channel estimation schemes based on the first and second measures.

20. The non-transitory computer readable storage media of claim 17, and further comprising instructions operable to select at least one parameter for the selected one of the plurality of channel estimation schemes, and wherein the instructions operable to compute the estimate of the channel information comprises instructions operable to use the selected parameters for the selected one of the plurality of channel estimation schemes.

21. The non-transitory computer readable storage media of claim 17, wherein the instructions operable to compute comprise instructions operable to compute the first measure to represent a degree to which the wireless channel varies with frequency and the second measure to represent a degree to which the channel varies with time.

* * * * *